United States Patent [19]

Marten et al.

[11] Patent Number: 4,917,024

[45] Date of Patent: Apr. 17, 1990

[54] COAL FIRED POWER PLANT WITH POLLUTION CONTROL AND USEFUL BYPRODUCTS

[75] Inventors: Jerome H. Marten, Baton Rouge, La.; G. Michael Lloyd, Lakeland, Fla.

[73] Assignee: Florida Institute of Phosphate Research, Lakeland, Fla.

[21] Appl. No.: 356,754

[22] Filed: May 24, 1989

[51] Int. Cl.⁴ .............................................. E23B 7/00
[52] U.S. Cl. .................................... 110/233; 110/229; 110/234; 110/345; 48/77; 48/101; 48/210; 423/542; 423/555
[58] Field of Search ............... 110/229, 230, 345, 233, 110/234; 48/101, 210; 423/542, 555; 422/168

[56] References Cited

U.S. PATENT DOCUMENTS

| | | |
|---|---|---|
| 2,649,166 | 8/1953 | Porter et al. . |
| 3,169,269 | 2/1965 | McDowell et al. . |
| 3,302,936 | 2/1967 | Ban . |
| 3,325,395 | 6/1967 | Ban . |
| 3,729,551 | 4/1973 | Gorin et al. . |
| 4,009,244 | 2/1977 | Atsukawa et al. . |
| 4,017,272 | 4/1977 | Anwer et al. . |
| 4,111,755 | 9/1978 | Ban . |
| 4,162,170 | 7/1979 | Grankcharov et al. . |
| 4,167,578 | 9/1979 | Mehta et al. . |
| 4,200,517 | 4/1980 | Chalmers et al. . |
| 4,220,454 | 9/1980 | Ban et al. . |
| 4,247,518 | 1/1981 | Charlet et al. . |
| 4,285,283 | 8/1981 | Lyon et al. ........................ 110/229 |
| 4,487,784 | 12/1984 | Kuroda et al. . |
| 4,503,018 | 3/1985 | Gardner et al. . |
| 4,515,754 | 5/1985 | Stehning . |
| 4,526,764 | 7/1985 | Stehning . |
| 4,544,542 | 10/1985 | Angevine et al. . |
| 4,602,573 | 7/1986 | Tanca ................................. 110/229 |
| 4,744,969 | 5/1988 | Marten et al. . |

Primary Examiner—Edward G. Favors
Attorney, Agent, or Firm—Bernard, Rothwell & Brown

[57] ABSTRACT

A coal fired power plant includes a coal gasification zone where coal is gasified in the presence of an oxidant-lean atmosphere under partial coal gasifying conditions to produce a carbonaceous char and a crude gas stream, an acid separating zone where sulfur-containing compounds are separated from the crude gas stream to produce a combustible gas stream, and a converting zone where the sulfur-containing compounds are converted to elemental sulfur. The combustible gas stream and the carbonaceous char are fed into a boiler which drives a generator to produce electricity; portions of the carbonaceous char product and the combustible gas stream are diverted into a gypsum desulfurization zone. $SO_2$-containing flue gas from the boiler is fed into a flue gas desulfurization zone. There, the $SO_2$-containing flue gas is contacted with lime and limestone to produce gypsum. The gypsum is fed to the gypsum desulfurization zone where it is heated with the diverted carbonaceous char under reducing conditions utilizing the diverted combustible gas stream to provide energy to produce a $SO_2$-containing gas stream. The $SO_2$-containing gas stream is recycled back to the coal gasification zone to provide at least a portion of the oxidant-lean atmosphere air used in the coal gasification zone.

28 Claims, 2 Drawing Sheets

COAL FIRED POWER PLANT WITH POLLUTION CONTROL AND USEFUL BYPRODUCTS

BACKGROUND OF THE INVENTION

The present invention relates to coal fired power plants and processes wherein pollution resulting from use of relatively low-value coal is reduced. More particularly, the invention relates to reduction of sulfur dioxide and nitrogen oxide emissions while producing useful by-products of the residue.

A typical coal fired coal power plant is equipped with a lime/limestone fuel gas desulfurization unit for the removal of sulfur dioxide from the flue gas by reacting the sulfur dioxide with lime or limestone to produce either calcium sulfite, calcium bisulfite, calcium sulfate, or a mixture of all three, collectively called gypsum. This gypsum which is typically collected in a gypsum pond is unsuitable for reuse and normally stored in a pile of fine particulate material. The conventional desulfurization unit does not adequately reduce nitrogen oxides in the flue gas. Additionally, the typical coal fired power plant has precipitators or the like to collect ash which also accumulates. Also, the typical coal fired power plant produces a bottom ash or slog which accumulates. The accumulating ashes and gypsum pose a long term potential threat to the ground water supply. Emission of $NO_x$ in the flue gas contributes to air pollution which threatens both animal and plant life.

Various approaches have been taken to find a way to reduce $NO_x$ levels passing through flue gas desulfurization units. U.S. Pat. No. 4,167,578, issued to Mehta, et al., describes a process of contacting a mixture of gases with a slurry of lime/limestone and an iron compound. The iron compound functions as a catalyst in the reaction between the nitrogen oxides in the gas mixture and sulfites and bisulfites formed when the sulfur dioxide in the mixture reacts with the lime/limestone. Ammonia is eventually recovered through the use of this process, but the final solids, $CaSO_4$ and $CaSO_3$, are simply discharged. U.S. Pat. No. 4,009,244, issued to Atsukawa, et al., discloses a process for removing oxides of nitrogen and sulfur from exhaust gases which includes using an alkali metal or alkaline earth metal iodide. Nitrogen oxide becomes nitrogen gas and sulfur oxides become gypsum.

Utilizing waste gypsum to produce a useful product has been previously suggested, for example, see U.S. Pat. Nos. 3,729,55, 4,162,170, and 4,247,518. One suggested process is to convert gypsum into sulfuric acid and lime or cement, including the utilization of coal to reduce the calcium sulfate within a fluidized bed reactor. The prior art processes for converting gypsum to sulfuric acid and lime or cement, including those employing fluidized bed reactors, have heretofore been uneconomical because of energy, labor and capital costs associated with the processes considered. One commercially valuable process for the conversion of gypsum into useful products is disclosed in U.S. Pat. No. 4,503,018 issued to Gardner et al., which is incorporated herein by reference in its entirety. The Gardner et al. process yields a sulfur-containing gas stream resulting from the thermal decomposition of the gypsum. More specifically, the Gardner et al. process involves charging a pelletized mixture of carbonaceous material and gypsum or phosphogypsum to a travelling grate where the mixture is dried and heated to produce a gaseous effluent containing sulfur dioxide and/or sulfur. After the pellets have undergone thermal decomposition, the lime residue may be sold or used in conventional applications. An improvement on the Gardner et al. process is disclosed in U.S. Ser. No. 927,439, filed Nov. 6, 1986, which is incorporated herein by reference in its entirety. The '439 application describes the addition of pyritic materials to the feed mix for desulfurization of phosphogypsum.

A process which combines coal gasification and gypsum desulfurization is disclosed in U.S. Pat. No. 4,744,969 to Marten et al. which is incorporated herein by reference in its entirety. The Marten et al. patent describes a process for the co-conversion of phosphogypsum and high-sulfur, low-BTU coal into sulfur-free and sulfur-rich gaseous streams, and usable aggregate.

While the Gardner et al. process and the Marten et al. process are valuable processes for converting gypsum into usable products, a need exists for a process which will reduce limestone consumption in the flue gas desulfurization step, reduce aggregate production, reduce $NO_x$ levels, and result in the recovery of essentially all of the sulfur as elemental sulfur, the most desirable by-product, using less energy and capital.

SUMMARY OF THE INVENTION

The present invention is summarized in the production of electrical energy and usable byproducts by heating coal in a coal gasification zone in the presence of an oxidant-lean atmosphere under partial coal-gasifying conditions to produce a carbonaceous char and a crude gas stream, separating sulfur-containing compounds from the crude gas stream to produce a combustible gas stream and a sulfur compound containing stream, converting the sulfur-containing compounds to elemental sulfur, burning a portion of the combustible gas stream and a portion of the carbonaceous char in an energy-conversion zone to produce electricity and $SO_2$-containing flue gas, feeding the remaining portions of the carbonaceous char product and the combustible gas stream into a gypsum desulfurization zone, feeding the $SO_2$-containing flue gas into a flue gas desulfurization zone, contacting the $SO_2$-containing flue gas with lime and/or limestone to produce gypsum, feeding the gypsum into the gypsum desulfurization zone where it is heated with the remaining portion of the carbonaceous char under reducing conditions utilizing burning of the remaining portion of the combustible gas stream to provide energy to produce a $SO_2$-containing gas stream and a sintered solid usable aggregate, and recycling the $SO_2$-containing gas stream back to the coal gasification zone to provide, in part, the oxidant-lean atmosphere.

A coal fired power plant which carries out a process in accordance with this invention includes coal gasification facilities for heating coal in the presence of an oxidantlean atmosphere under partial coal-gasifying conditions to produce a carbonaceous char and a crude gas stream, means for separating sulfur-containing compounds from the crude gas stream to produce a combustible gas stream and a sulfur compound-containing stream, facilities for converting the sulfur compound-containing stream into elemental sulfur, energy-conversion facilities for burning a portion of the combustible gas stream and a portion of the carbonaceous char to produce electricity and $SO_2$-containing flue gas, flue gas desulfurization facilities for contacting the $SO_2$-containing flue gas with lime and limestone to convert sulfur compounds in the flue gas to gypsum, gypsum desulfurization facilities for heating the gypsum and the remaining portion of carbonaceous char under reducing conditions utilizing burning of the remaining portion of the combustible gas stream to provide energy to produce a $SO_2$-containing gas stream and a sintered solid usable aggregate, and facilities for recycling the $SO_2$-containing gas stream to the coal gasification facilities.

The process eliminates the ground water pollution problem created by gypsum ponds, since gypsum is fed into the gypsum desulfurization zone and reduced to an aggregate usable in paving, construction, etc. The $SO_2$ produced in the gypsum desulfurization zone is recycled to the coal gasification zone and provides the oxidant-lean atmosphere required for the partial coal-gasifying conditions. Removable sulfur compounds produced in the gasification step are removed from the crude gas stream and converted to elemental sulfur. Due to removal of a substantial portion of the sulfur compounds from the combustible gas stream, less limestone is required in the flue gas desulfurization zone. This reduction also results in lower gypsum production and, ultimately, less aggregate production. By using a portion of the combustible gas stream for secondary or "overburning" in the boiler or energy-producing zone, a significant reduction in $NO_x$ production can be achieved. $NO_x$ reductions of about 30-60% preferably result from using the process of this invention. If no market exists for fly ash or bottoms ash produced by combustion of the carbonaceous char to produce electricity, these ashes can also be incorporated into the gypsum desulfurization step thereby converting a potential pollutant into a solid, usable aggregate.

DETAILED DESCRIPTION OF THE INVENTION

Figure 1:
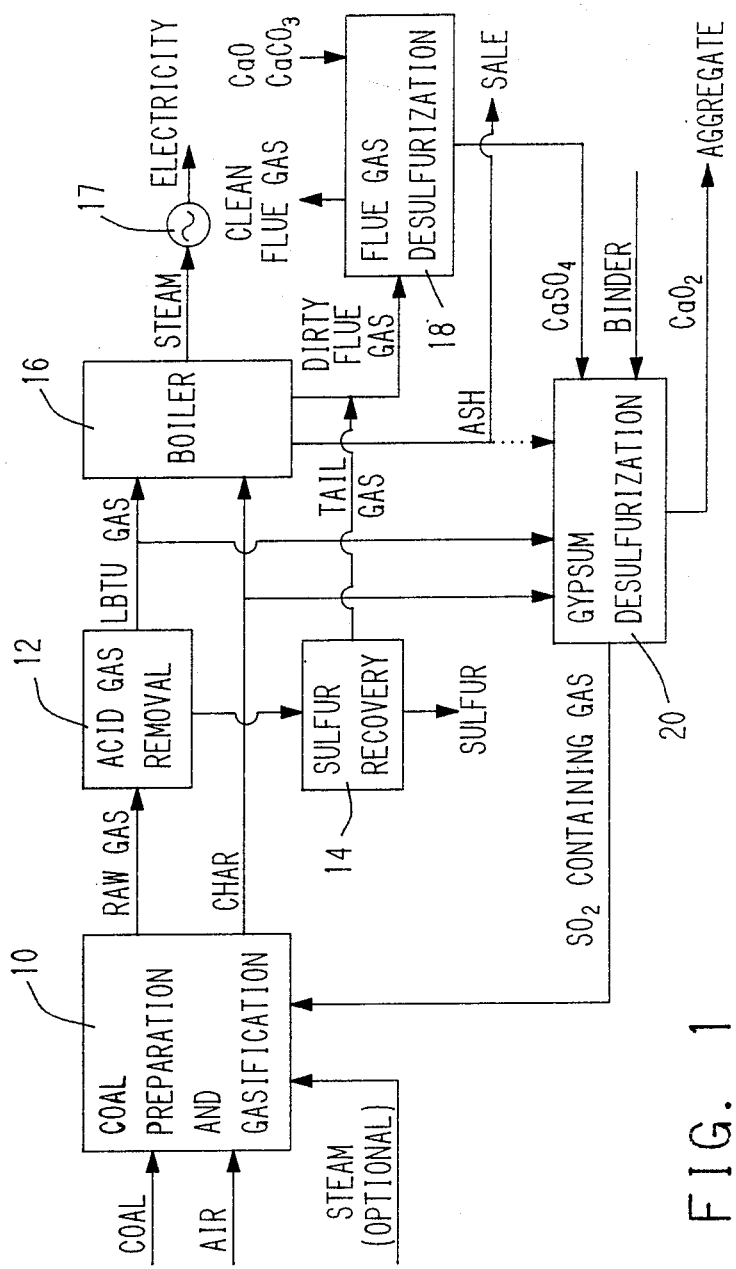
FIG. 1 is a schematic diagram of a coal fired power plant in accordance with the present invention.

As illustrated in FIG. 1, a coal fired power plant in accordance with the apparatus and method of the invention includes a coal preparation and gasification unit 10 wherein coal is partially gasified to produce raw gas and char. The raw gas is passed through unit 12 wherein substantial portions of sulfur compounds in the raw gas are removed leaving a LBTU gas which is passed, along with the char from the unit 10, to a boiler 16. In the boiler 16 the LBTU gas and char are burned to generate steam which operates generator 17 to produce electricity. Flue gas from the boiler 16 is passed through flue gas desulfurization unit 18 where $SO_2$ is reacted with lime and/or limestone to produce gypsum. The gypsum and ash (not sold directly on the market) from the boiler 16 is fed to gypsum desulfurization unit 20 along with a portion of the char from unit 10 and a portion of the LBTU gas from unit 12. In the gypsum desulfurization unit 20, a mixture of the gypsum and char is heated by burning the LBTU gas to reduce the gypsum and produce an $SO_2$ stream and aggregate. The $SO_2$ stream is passed back to the gasification unit where the $SO_2$-containing stream is used together with supplemental air to achieve the low severity coal gasification. The sulfur compounds are converted in sulfur recovery unit 14 to elemental sulfur. Tail gas from unit 14 can be processed through the flue gas desulfurization unit 18 prior to discharge to the atmosphere. Both the sulfur and aggregate produced in the process of FIG. 1 are valuable or useful products. The sulfur can be sold in commerce and the aggregate can be used in road or building construction.

In the coal gasification unit 10, the coal is reacted under partial gasifying conditions so as to leave a substantial portion of the carbon as a carbonaceous char similar to that disclosed in the above mentioned U.S. Pat. No. 4,744,969 to Marten et al. The partial gasifying conditions are achieved primarily by conducting the gasification in an oxidant-lean atmosphere at a lower temperature than is employed in conventional coal gasification operations where substantially complete gasification of the carbon content of the coal is desired. The extent of gasification of coal is a function of the temperature of operation, the flow rate and oxygen content of the gas fed into the gasifier, the nature of the coal (i.e., BTU content), and the residence time of the coal in the gasifier.

The partial gasifying conditions generally include an oxidant-lean atmosphere and a temperature of from about 700° C. to about 1100° C. Substantially lower temperatures may not achieve adequate gasification or volatilization of the sulfur components of the coal, whereas higher temperatures may result in excess gasification or difficulties in controlling the rate of gasification. The coal-gasifying conditions preferably include a temperature of from about 750° C. to about 1000° C.

As used herein, the term "oxidant-lean atmosphere" indicates that, during the time the coal is in the gasifier, insufficient oxidants, i.e., oxygen and $SO_2$-containing gas, are supplied to the coal to cause complete combustion of the volatile carbon compounds. Thus, both the flow rate and oxidant content of the gas supplied to the coal gasifier may be varied to control the degree of combustion. Advantageously, the amount of oxygen and $SO_2$-containing gas supplied to the gasifier is sufficient to convert complex volatile carbon compounds to simple combustible gases, such as carbon monoxide, methane and hydrogen. The oxidant-lean atmosphere is provided by air mixed with the $SO_2$-containing stream obtained from the gypsum desulfurization unit 20. Oxygen in the $SO_2$-containing stream and the supplemental oxygen stream serves as the main oxidant in the gasification step. The $SO_2$ is reduced to $H_2S$ and COS while in the coalgasifying zone and replaces an equivalent amount of oxygen in the gasification process. The flow rates of the sulfur-containing gas stream and the air stream are controlled to obtain the desired gasification temperature and degree of combustion.

As is known in the art, steam may also be introduced into the coal gasifier. Advantageously, waste heat may be recovered from the rude gas stream in a waste heat boiler, which is used as a source of steam for the gasifier. It is well-known to use steam as a reactant in coal gasification processes. The steam provides a source of hydrogen, resulting in a gas richer in hydrogen. Moreover, steam acts as a reaction or temperature moderator and thus provides an additional means for controlling the temperature. When steam is employed in the gasification step, the amount is controlled, in a combination with the amount of oxidant, to achieve a desired gasifier exit temperature. In a preferred embodiment, the oxidant-lean atmosphere contains up to about 20% by volume of steam.

One advantage of this process is that the coal which is fed to the gasifier may be of varying quality, and one may readily switch from one grade of coal to another. Typical coals include lignite, subbituminous, bituminous and the like. Low value coal having a high sulfur content is particularly suitable and adds to the efficiency of the power plant due to its lower price and contribution of sulfur to maintain a practical level of production of elemental sulfur.

Conventional coal gasification equipment may be used, provided that it has means for controlling operating parameters so as to achieve partial gasifying conditions. Examples of suitable gasification equipment are fixed and fluid bed reactors. One example of a fluidized bed gasifier that may be used is the so-called "Winkler" gasifier, and is described in U.S. Pat. No. 4,017,272, incorporated herein by reference. A particularly preferred fluidized bed gasification process is the U-gas process, described in Patel, *Oil and Gas Journal*, Aug. 1, 1977, pp. 51–54.

The reaction is the gasifier is advantageously conducted under superatmospheric pressures, generally above 1.5, for instance from about 1.5 to 20, advantageously from about 2 or 2.5 to 15, and preferably from about 6 to 14, atmospheres absolute. The selection of the superatmospheric pressure which may be employed in a given plant will depend on the design and pressure tolerance of the processing equipment, the pressure drop provided by the equipment downstream of the gasifier, the particular use desired for the product gas, whether multiple gasifiers are used in trains and the like. The use of the higher reaction pressures in this invention may also enhance the throughput of the gasifier.

When a fluidized bed type gasifier is used, the fluidizing medium advantageously may be steam, which also serves as a reactant. It can also be air, carbon dioxide or recycle gas, each with or without steam. Steam is particularly attractive as a fluidizing medium, and may also be used as a diluent gas for the gasifying medium, in that it can be condensed and easily separated from the crude gas stream in waste heat recovery leaving a higher heat value product gas.

The coal should only have a residence time within the oxidant-lean atmosphere in the gasifier for a time sufficient to produce a gaseous effluent and the desired carbonaceous char. The partial gasifying conditions will preferably produce a carbonaceous char which contains from about 50 to about 80% weight carbon. The optimum residence time may vary widely and is a function of the gasifier temperature, the oxidant content and flow rate of the oxidant-lean atmosphere, the coal quality, particle size, and reactivity (e.g., the porosity, volatiles content), and the like. For a particular degree of reaction and gasifier type, the optimum residence time may be readily determined empirically.

In one preferred embodiment of the present process, the coal gasification step is conducted in a pressurized, fluidized bed gasifier, with steam and the oxidant-lean atmosphere introduced at spatially separate points, substantially uniformly distributed circumferentially, at different levels in the gasifier and in amounts sufficient to substantially contact and gasify a portion of the constituents of the fluidized bed under controlled selective reaction conditions. The details of such procedure are taught in the above-mentioned U.S. Pat. No. 4,017,272 incorporated herein by reference.

The gasifier produces a crude gas stream containing various amounts of nitrogen, carbon monoxide, carbon dioxide, hydrogen, hydrogen sulfide and methane. The amount of methane produced may be influenced by the operating conditions of the gasifier.

In addition to the above gases in the crude gas stream, the stream typically contains particulate materials including char and sulfur compounds. Preferably, the crude gas stream is passed through a particulate removal zone (not shown), i.e., dry cyclone, and the particulates are recycled to the gasifier or fed to the gypsum desulfurization reactor.

After the particulates have been removed from the crude gas stream, the sulfur-containing compounds are separated from the crude gas stream in the acid gas removal unit 12 and converted into elemental sulfur in unit 14. Sulfur recovery processes are well-known, and any of a variety of such processes may be employed for the sulfur-removing step of suitable regenerable acid gas removal process. Preferred processes include the Selexol process, disclosed in U.S. Pat. No. 2,649,166, and the methyldiethanolamine (MDEA) process. The acid gas conversion unit 14 is a conventional unit, such as a Claus plant, for converting sulfur compounds to elemental sulfur.

The remaining combustible gas from the sulfur-removal step 12 is a clean-burning, low-BTU gas stream which is used advantageously as an energy source for the boiler 16 and the gypsum desulfurization unit 20. By using a portion of the LBTU fuel produced for secondary or "over-burning" in the boiler, significant reduction in $NO_x$ production may be achieved. This reduction is in addition to that achieved by the destruction of nitrogen-containing organic compounds during the coal gasification process. The combustible gas is burned in an energy-producing zone to produce steam which, in turn, is used to generate electrical power. The combustible gas stream may alternately be used as a power gas, i.e., a fuel for a gas turbine. A portion of the combustible gas stream is used to heat the gypsum and carbonaceous char in the gypsum desulfurization unit 20.

Where the combustible gas and char are burned in a boiler to produce steam, other products resulting from the burning include fly ash, bottom ash and $SO_2$-containing flue gas. The ash is sold or, if no market for direct sale is available, is fed from the boiler or energy-producing zone into the gypsum desulfurization zone 20 where it is mixed with the gypsum and char. The $SO_2$-containing flue gas is a mixture containing sulfur dioxide which needs to be removed prior to release to the atmosphere. The flue gas is fed into a flue gas desulfurization zone where it is contacted with lime (CaO) and/or limestone ($CaCO_3$). Flue gas desulfurization processes are known in the art and any of the various processes may be used in the process of this invention. The sulfur oxides in the flue gases are converted into a mixture of sulfite, bisulfite and gypsum and the flue gases are made harmless so that the thus cleaned flue gas may be expelled to the atmosphere. The gypsum mixture is then fed into the gypsum desulfurization zone where it is heated with carbonaceous char under reducing conditions utilizing the combustible gas stream to provide energy to produce a sulfur-containing gas stream and an aggregate which can be used for paving materials.

Aside from the crude gas stream, a carbonaceous char is produced in the gasifier. Since there has been removal of the volatiles in the coal to form the crude coal gas stream, there will be some increase of the ash content in the product char on a weight basis. Upon removal from the gasifier, a portion of the char is fed to the gypsum desulfurization zone where it is combined with the gypsum produced in the flue gas desulfurization zone, as well as ash from the energy-producing zone, and reacted under reducing conditions. The proportions of char, gypsum and other components are such that the non-gypsum portion of the feed mixture contains sufficient reducing potential to reduce a substantial portion, preferably substantially all, of the sulfur in the gypsum to gaseous compounds of sulfur in a +4 or lower oxidation state. While the weight percentage of the char to the overall weight of the total feed mixture may vary, the char is generally employed in amounts to provide a carbon content ranging from about 3 to about 11% by weight of the total feed mixture on a dry weight basis. Preferably, the weight percent of carbon is from about 4 to about 10 percent by weight. The particle size of the gypsum may range from about 20 mesh to 500 mesh and contains from 60 to 99% $CaSO_4$ in the form of crystals. While the amount of gypsum in the mixture can vary, the gypsum is generally present in amounts from about 50 to about 80 percent by weight of the overall mixture on a dry weight basis. Preferably, the gypsum is present in amounts ranging from about 55 to about 75 percent by weight of the feed mixture.

Other materials may be fed into the gypsum desulfurization zone besides the gypsum from the flue gas desulfurization zone, including ash from the energy producing zone, the combustible gas stream and the carbonaceous char. In a preferred embodiment and in accordance with the teachings of U.S. Ser. No. 927,439, filed Nov. 23, 1986, which is incorporated by reference, a combination of gypsum, pyrite and carbonaceous material, which in the present case can be char, may be used as the feed mix for the gypsum desulfurization reactor. In addition to pyrite, other iron and sulfur-containing minerals may be used, all of which are referred to herein collectively as "pyritic materials." Such pyritic materials include, for example, pyrite, metallic iron, elemental sulfur, iron oxide, iron (II) sulfide, and combinations thereof. As taught in the above-cited application, the combination of pyrite and carbonaceous material significantly improves the solid sintered by-product and increases the sulfur level of the gaseous effluent which is produced in the gypsum desulfurization reactor. In addition, the sulfur removal efficiency of the overall process is improved while addressing the ecological need for a clear and efficient method of disposal for pyritic materials. The amount of pyritic material added to the feed mix may vary considerably depending on the amount of char and other sulfur compounds added to the mix and the amount of ash contributed by the char and the fly ash from the energy-producing zone. In general, the pyritic materials may be present in amounts ranging from about 0 to about 20 percent by weight of the total feed mixture on a dry weight basis. Preferably, the weight percent of the pyritic material is from about 5 to about 15 percent of the feed mixture. The ash from the boiler, if used, may supply a substantial portion of the "pyritic materials" required.

Optional additives may be incorporated into the feed mixture. Examples of such additives include clay (e.g. clay slime tailing resulting from the benefication of phosphate rock), recycled sintered material (also known as returns), and binding agents such as lime. The preferred additive is clay. The non-return additives may be present in amounts from 0 to 5 percent by weight of the feed mixture on a dry weight basis with amounts of from 1 to about 2 percent by weight being preferred. Recycled sintered material or returns may be present in the feed mix in greater amounts ranging from about 5 to 25 percent by weight of the feed on a dry weight basis with amounts of from 10 to about 20 percent by weight being preferred.

The gypsum desulfurization step involves heating the feed mixture under reducing conditions. The feed mixture is heated to a temperature sufficiently high to cause thermal degradation of the gypsum and to effect the reduction of the sulfur compounds to gaseous sulfur compounds in the +4 or lower oxidation state. The reaction temperature of the feed mixture generally ranges from about 1100° C. to about 1500° C., preferably from about 1200° C. to about 1300° C. In accordance with the present process, this temperature is initiated by burning a portion of the combustible gas resulting from the coal gasification and sulfur removal operations. Additional air is then introduced into the reactor in an amount sufficient to generate sufficient heat to support the endothermic gypsum-reduction reactions, yet still maintain reducing conditions. As used herein, the term "reducing conditions" means that the overall conditions in the reactor favor reduction of the gypsum compounds. Although both oxidation and reduction reactions take place in the reactor, the reducing conditions permit the formation of gaseous sulfur compounds.

Various types of reactors may be used to heat the gypsum containing feed mixture. Examples include rotary kilns, fluidized beds and travelling grates. A particularly preferred reactor is a circular travelling grate, such as that employed in the Gardner process described above.

When a circular travelling grate reactor is used, it is preferred that the feed mixture be formed into pellets. Such pellets may occur in a variety of shapes, such as balls, nodules, cylindrical pellets, etc. For proper pelletizing, at least a portion of the mixture is preferably relatively fine. The pelletizing can be accomplished in an open circuit balling pan or drum arrangement or a closed circuit balling pan or drum arrangement with sizing devices such as vibrating screens or roller separators. Preferably, the pelletizing operation produces balls or green pellets about 1 inch (25.4 mm) or less in diameter. One example of a suitable pelletizing pan apparatus is illustrated in U.S. Pat. No. 3,169,269. Water and/or other ingredients may be added to the mixture being pelletized to aid in forming green pellets.

In a preferred embodiment, the travelling grate mechanism includes sealed hoods and burners for heating the pellets under controlled reaction conditions to evolve sulfur and/or sulfur dioxide. One example of a preferred travelling grate mechanism is a liquid sealed circular grate (Carousel type) similar to the circular travelling grates commercially available from Davy McKee Corporation, Lakeland, Florida, 33807, U.S.A., having a size sufficient to handle large quantities of pellets economically. Travelling grates that may be used in the present process are also disclosed in U.S. Pat. Nos. 3,302,936; 3,325,395; 4,111,755; 4,200,517; and 4,220,454 which are incorporated by reference in their entireties.

Figure 2:
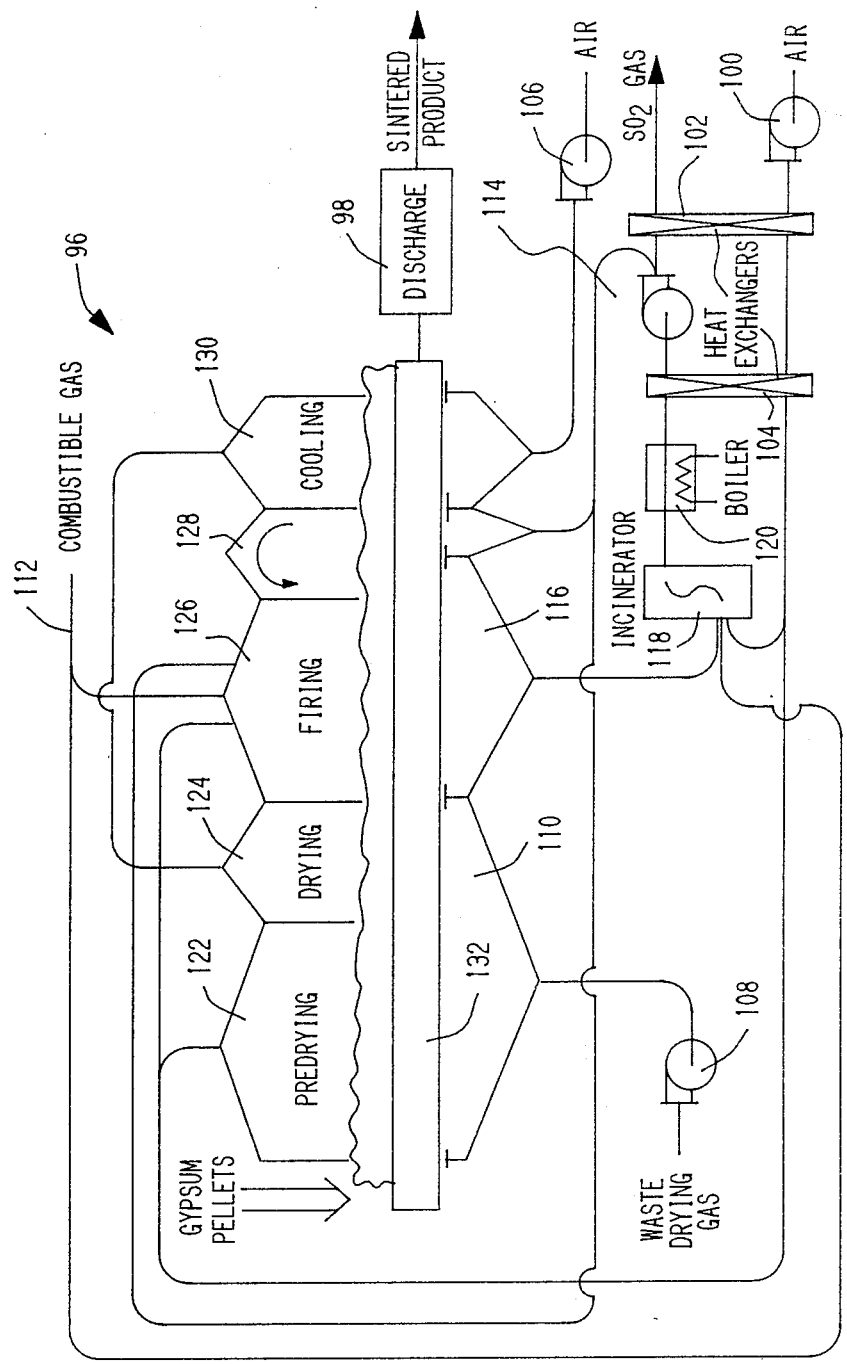
FIG. 2 is a schematic diagram of an embodiment of a travelling grate reactor suitable for use in the gypsum desulfurization zone of the power plant of FIG. 1.

An example of a suitable circular travelling grate mechanism is illustrated in FIG. 2. The mechanism 96 includes facilities (not shown) for depositing a charge of green pallets upon a moving grate 132 which successively moves that charge through various zones, such as predrying zone 122, drying zone 124, firing zone 126, postfiring zone 128 and cooling zone 130, within a sealed hood to a facility 98 for discharging solids from the travelling grate. In the predrying zone 122, air from blower 100 which is heated in heat exchangers 102 and 104 by the product gas, is employed to remove at least a portion of the moisture from the green pellets. Blower 106 drives air through the hot charge on the grate 132 in the cooling zone 130 and thence to the drying zone 124 where the air completes the drying of the green pellets. The moist waste drying air is removed by blower 108 from a wind box 110 extending in the predrying and drying zones. Line 112 supplies combustible gas from the coal gasifier after sulfur removal (12, FIG. 1) to the firing zone 126 sufficient to heat the surface of the charge to a temperature within the range of 1100° C. to 1550° C. Fresh air from the blower 100 provides oxygen to burn the combustible gas in chamber 126. Recycled product gas from blower 114 is also supplied to the firing zone 126. The product gas is removed from the firing zone 126 via wind box 116 and may be then passed through an incinerator 118 where combustible gas products are burned with air from blower 100 and combustible gas from line 112. The use of the incinerator is optional. Thus, incinerator 118, boiler 120, and heat exchangers 104 and 102 could be removed from the process of this invention and the product gas may be removed from wind box 116 and recycled directly back to the gasifier (10, FIG. 1). In post-firing zone 128, a portion of the product gas from blower 114 is recycled to pass upward through the charge and then downward into the product receiving wind box 116 to remove the greatest portion of the product gas from the charge. The charge is retained in the post-firing zone for a period of from about 10 to about 30 minutes. If the incinerator 115 is used, the output product gas from the incinerator 118 is passed through a waste heat boiler 120 and the heat exchangers 104 and 102 where heat from the process is recovered. The effluent gas removed through heat exchanger 102 is passed back to a gasifier (10, FIG. 1), to be recycled as an oxidant in the oxidant-lean atmosphere required for partial gasification of coal.

The following example represents a computer simulation of the process of the present invention.

EXAMPLE

At a feed rate of 366,700 lbs. per hour (additionally contains 19,300 lbs. per hour of moisture) bituminous coal is (scrubbed and dried and then) fed into a pressurized fluid bed gasifier. Air is introduced to the gasifier at a feed rate of 660,775 lbs. per hour and $SO_2$-containing gas is provided from the gypsum desulfurization zone at a feed rate of 85,270 lbs. per hour. Steam is introduced to the gasifier at a feed rate of 116,027 lbs. per hour. The temperature of the gasifier is controlled at about 950° C. 251,000 lbs. per hour of char are discharged from the gasifier with 245,400 lbs. per hour transferred to the boiler and 5,600 lbs. per hour transferred to the gypsum desulfurization zone.

The crude coal gas stream from the gasifier is passed to the acid gas removal zone where the sulfur-containing compounds are removed and transferred to a sulfur recovery zone. Elemental sulfur is recovered from the sulfur recovery zone at 21,480 lbs. per hour and a tail gas produced in this zone is transferred to mix with dirty flue gas to be fed into the flue gas desulfurization zone.

858,223 lbs. per hour of LBTU gas is removed from the acid gas removal zone and 853,000 lbs. per hour is fed into the boiler. The remaining 5,223 lbs. per hour of LBTU gas is fed into the gypsum desulfurization zone. In the boiler, the LBTU gas and char raise steam and produce 58,000 lbs. per hour of fly ash, and 4,249,000 lbs. per hour of dirty flue gas. The steam is then fed to a generator and used to produce electricity. The dirty flue gas is fed into a flue gas desulfurization zone with the tail gas from the sulfur recovery zone and 23,000 lbs. per hour of limestone. 4,240,000 lbs. per hour of clean flue gas and 33,720 lbs. per hour of gypsum are produced from the flue gas desulfurization.

A feed mixture is continuously prepared for the gypsum reactor in a balling mechanism which forms the mixture into pellets suitable for charging into a travelling grate reactor. The components of the feed mixture are introduced to the balling mechanism at a feed rate of 5640 lbs. per hour of the char, 33,720 lbs. per hour for the gypsum, 1,660 lbs per hour for the binder and 10,060 lbs. per hour for the fly ash.

The surface layer of the pelletized feed mixture is heated to a temperature of 900°–1200° C. on a rotary grate which is fueled by the LBTU gas from the acid gas removal zone at a feed rate of 52223 lbs. per hour. The reaction is maintained by feeding air to the reactor to maintain a temperature of 1200°–1500° C. The rotating grate produces 31,520 lbs. per hour of a solid sintered material and 85,270 lbs per hour of $SO_2$-containing gas which is fed back into the coal preparation and gasification zone. The sulfur dioxide dioxide, 6.0 mol % oxygen and 6.4 mol % of sulfur dioxide.

While the present invention has been described with reference to particular embodiments thereof, it will be understood that numerous modifications may be made by those skilled in the art without actually departing from the spirit and scope of the invention as defined in the appended claims.

We claim:

1. A coal fired power plant comprising:
   (a) coal gasification means for heating coal in the presence of an oxidant-lean atmosphere under partial coal-gasifying conditions to produce a carbonaceous char and a crude gas stream;
   (b) means for separating sulfur-containing compounds from the crude gas stream to produce a combustible gas stream and a sulfur compound-containing stream;
   (c) means for converting the sulfur compound containing stream into elemental sulfur;
   (d) energy-conversion means for burning a portion of the combustible gas stream and a portion of the carbonaceous char to produce electricity and $SO_2$-containing flue gas;
   (e) flue gas desulfurization means for contacting the $SO_2$-containing flue gas with lime and limestone to convert sulfur compounds in the flue gas to gypsum;
   (f) gypsum desulfurization means for heating the gypsum and the remaining portion of carbonaceous char under reducing conditions utilizing burning of the remaining portion of the combustible gas stream to provide energy to produce a $SO_2$-containing gas stream and a sintered usable aggregate; and
   (g) means for recycling the $SO_2$-containing gas stream from step (f) to the coal gasification means.

2. The coal fired power plant of claim 1, wherein said coal gasification means heats particulate coal in the presence of an oxidant-lean atmosphere which contains up to about 20% by volume of steam, wherein there are controlling means for controlling the oxidant content and the feed rate of the oxidant-lean atmosphere to maintain a temperature of from about 700° C. to about 1100° C.

3. The coal fired power plant of claim 1, wherein the feed controlling means controls feed rate of the oxidant-lean atmosphere to maintain a temperature of from about 750° C. to about 1000° C.

4. The coal fired power plant of claim 1, wherein the partial coal-gasifying conditions include a pressure from about 1.5 to about 20 atmospheres.

5. The coal fired power plant of claim 1, wherein there are means to control the partial coal-gasifying conditions to produce a carbonaceous char which contains from about 40 to 80% weight carbon.

6. The coal fired power plant of claim 1, wherein at least a portion of the combustible gas stream is used for producing steam and the steam is directed to the oxidantlean atmosphere in the coal gasification means.

7. The coal fired power plant of claim 1, wherein the gypsum desulfurization means for the heating of the gypsum and the carbonaceous char passes a mixture of air and the combustible gas through the gypsum and the carbonaceous char, wherein there are means for controlling the flow ratios of the air and the combustible gas to maintain a temperature sufficiently high to cause thermal decomposition and reduction of the gypsum, and to maintain reducing conditions within the gypsum and the carbonaceous char.

8. The coal fired power plant of claim 7, wherein the flow means for controlling the flow rates of the air and the combustible gas stream maintain a temperature of the gypsum and the carbonaceous char of from about 1100° C. to about 1500° C.

9. The coal fired power plant of claim 8, wherein the flow rates of the air and the combustible gas stream are controlled to maintain a temperature of from about 1200° C. to about 1300° C.

10. The coal fired power plant of claim 1, wherein the gypsum desulfurization means is a rotary kiln, a fluid bed reactor or a travelling grate reactor.

11. The coal fired power plant of claim 1, wherein the gypsum desulfurization means is a travelling grate reactor.

12. The coal fired power plant of claim 11 wherein step (f) includes means for moving the travelling grate carrying a charge of pelletized feed mixture successively through firing and post-firing zones, and means for retaining charge in the post-firing zone for a period of from about 10 to about 30 minutes.

13. The coal fired power plant of claim 1, wherein the coal is lignite, subbituminous or bituminous.

14. The coal fired power plant of claim 13, wherein the coal is high sulfur coal.

15. A process for converting coal into electrical energy and usable byproducts, comprising the steps of:
(a) heating coal in a coal gasification zone in the presence of an oxidant-lean atmosphere under partial coal-gasifying conditions to produce a carbonaceous char and a crude gas stream;
(b) separating substantial portions of sulfurcontaining compounds from the crude gas stream to produce a combustible gas stream and a sulfur compound containing stream;
(c) converting the sulfur-containing compounds into elemental sulfur;
(d) burning a portion of the combustible gas stream and a portion of the carbonaceous char to power energy-conversion means to produce electricity and $SO_2$-containing flue gas;
(e) feeding the remaining portions of the carbonaceous char product and the combustible gas stream into a gypsum desulfurization zone;
(f) feeding the $SO_2$-containing flue gas from the energy-conversion means into a flue gas desulfurization zone;
(g) contacting the $SO_2$-containing flue gas with lime and limestone in the flue gas desulfurization zone to convert sulfur compounds in the flue gas to gypsum;
(h) feeding the gypsum into the gypsum desulfurization zone;
(i) heating the gypsum and the remaining portion of the carbonaceous char in the gypsum desulfurization zone under reducing conditions utilizing burning of the remaining portion of the combustible gas stream to provide energy to produce a $SO_2$-containing gas stream and a sintered usable aggregate, and
(j) recycling the $SO_2$-containing gas stream from step (i) to the coal gasification zone to provide at least a portion of the oxidant-learn atmosphere.

16. The process of claim 15, wherein step (a) comprises heating particulate coal in the presence of an oxidant-lean atmosphere which contains up to about 20% by volume of steam, wherein the oxidant content and the feed rate of the oxidant-lean atmosphere are controlled to maintain a temperature of from about 700° C. to about 1100° C.

17. The process of claim 16, wherein the feed rate of the oxidant-lean atmosphere is controlled to maintain a temperature of from about 750° C. to about 1000° C.

18. The process of claim 17, wherein the partial coal-gasifying conditions include a pressure from about 1.5 to about 20 atmospheres.

19. The process of claim 15, wherein the partial coal-gasifying conditions of step (a) are controlled to produce a carbonaceous char which contains from about 40 to about 80% weight carbon.

20. The process of claim 15, wherein at least a portion of the combustible gas stream is used for producing steam and the steam is directed to the oxidant-lean atmosphere of step (a).

21. The process of claim 15, wherein the heating of the gypsum and the carbonaceous char in step (i) is achieved by passing a mixture of air and the remaining portion of the combustible gas through the gypsum and the carbonaceous char, wherein the flow ratios of the air and the combustible gas are controlled to maintain a temperature sufficiently high to cause thermal decomposition and reduction of the gypsum, and to maintain reducing conditions within the gypsum and the carbonaceous char.

22. The process of claim 21, wherein the flow rates of the air and the combustible gas stream are controlled to maintain a temperature of the gypsum and the carbonaceous char of from about 1100° C. to about 1500° C.

23. The process of claim 22, wherein the flow rates of the air and the combustible gas stream are controlled to maintain a temperature of from about 1200° C. to about 1300° C.

24. The process of claim 15, wherein step (i) is conducted in a rotary kiln, fluid bed reactor or a travelling grate reactor.

25. The process of claim 15, wherein the heating of step (i) is conducted in a travelling grate reactor.

26. The process of claim 25 wherein step (i) includes moving the travelling grate carrying a charge of pelletized feed mixture successively through firing and post-firing zones, and the charge is retained in the post-firing zone for a period of from about 10 to about 30 minutes.

27. The process of claim 15, wherein the coal is lignite, subbituminous for bituminous.

28. The process of claim 27, wherein the coal is high sulfur coal.

* * * * *

UNITED STATES PATENT AND TRADEMARK OFFICE
CERTIFICATE OF CORRECTION

PATENT NO. : 4,917,024

DATED : April 17, 1990

INVENTOR(S) : Jerome H. Marten et al.

It is certified that error appears in the above-identified patent and that said Letters Patent is hereby corrected as shown below:

Column 10, line 26, "52223" should be --5,223--.

Column 10, line 32, after the word "sulfur dioxide" insert the following: --containing gas on a dry basis is 15.5 mol % of carbon--.

Column 11, lines 22 and 23, "oxidantlean" should be --oxidant-lean--.

Column 11, line 65, "sulfurcontaining" should be --sulfur-containing--.

Signed and Sealed this

Twenty-third Day of July, 1991

Attest:

HARRY F. MANBECK, JR.

*Attesting Officer*     *Commissioner of Patents and Trademarks*